United States Patent [19]
Lackstrom et al.

[11] Patent Number: 5,246,350
[45] Date of Patent: Sep. 21, 1993

[54] HIGH EFFICIENCY SOLAR POWERED PUMPING SYSTEM

[75] Inventors: David Lackstrom, Medina, Ohio; Kidambi Raghunathan, Piscataway, N.J.

[73] Assignee: International Product & Technology Exchange, Inc., Piscataway, N.J.

[21] Appl. No.: 892,083

[22] Filed: Jun. 2, 1992

[51] Int. Cl.[5] .................................... F04B 17/00
[52] U.S. Cl. ........................... 417/379; 60/641.8
[58] Field of Search .............. 417/379; 91/344; 60/641.8; 126/661, 658, 663, 705

[56] References Cited

U.S. PATENT DOCUMENTS

| | | | |
|---|---|---|---|
| 1,802,635 | 4/1931 | Eaton | 126/661 |
| 3,937,599 | 2/1976 | Thureau | 417/379 |
| 4,245,620 | 1/1981 | Heinemann | 126/663 |
| 4,286,580 | 9/1981 | Sitnam | 126/658 |
| 4,290,419 | 9/1981 | Rabedeaux | 126/658 |
| 4,291,683 | 9/1981 | Bayles | 126/663 |
| 4,303,059 | 12/1981 | Ford | 126/658 |
| 4,426,998 | 1/1984 | Dubosque | 126/663 |
| 4,666,376 | 5/1987 | Solomon | 417/379 |
| 4,682,582 | 7/1987 | Zsida | 126/440 |
| 4,682,937 | 7/1987 | Credle, Jr. | 417/393 |
| 4,683,914 | 8/1987 | Brisland | 137/625.48 |
| 4,686,836 | 8/1987 | Pacye et al. | 62/235.1 |
| 4,720,978 | 1/1988 | Spacer | 60/641.8 |
| 4,765,144 | 8/1988 | Spacer | 417/379 |
| 4,881,521 | 11/1989 | Keliner | 126/658 |

FOREIGN PATENT DOCUMENTS 3542865  7/1986  Fed. Rep. of Germany ...... 417/379

OTHER PUBLICATIONS

MTD Thermal Form No. 770-6979D Solar Water Pumping Instructions.

*Primary Examiner*—Richard A. Bertsch
*Assistant Examiner*—Peter Korytnyk
*Attorney, Agent, or Firm*—Ralph E. Jocke

[57] ABSTRACT

A high efficiency solar powered water pumping system (10) includes a solar collector (12) for heating and vaporizing a working fluid. The vaporized working fluid is passed to a motor and valve assembly (20) that alternatively delivers the working fluid to a power unit (22) and exhausts the working fluid from the power unit to a condenser (32). The power unit has a driving member (128) that moves up and down driving a sucker rod (194) of a sucker rod assembly (26) which raises water from a well in the earth. The water pumped from the ground passes through a tube (36) in the condenser. The working fluid which has been exhausted from the power unit into the condenser, condenses to a liquid. The liquid working fluid is then pumped from the condenser by a positive displacement pump (40) and is returned to the solar collector to repeat the cycle.

31 Claims, 12 Drawing Sheets

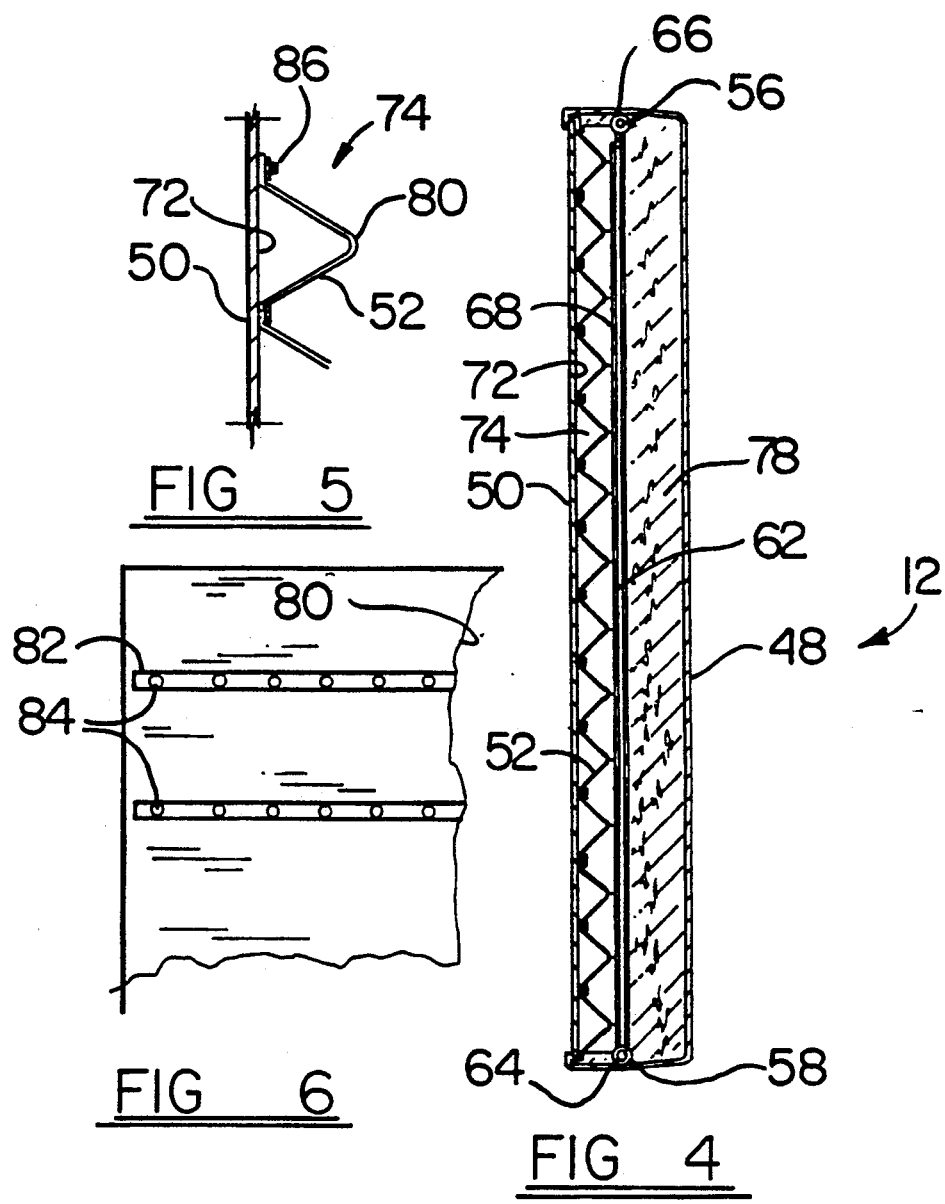

HIGH EFFICIENCY SOLAR POWERED PUMPING SYSTEM

TECHNICAL FIELD

This invention relates to fluid pumping systems. Specifically, the invention relates to a solar powered system for pumping water from a well.

BACKGROUND ART

In many areas of the world water may be obtained from a ground water well. Unfortunately, before the water can be put to use, a pumping system must be provided to bring the water to the surface.

In areas where electricity is available, electrically driven pumps are typically used to pump the water from the ground. Unfortunately, electricity is not available everywhere. In remote areas other types of pumping systems must be provided. One approach in remote areas has been to use an engine powered by petroleum fuel to drive a pump. This is done either by having the engine power the pump directly or by having the engine drive an electric generator, and using an electric pump. The drawback of using an engine is that fuel must be brought to the remote site. This may be impossible in some locations.

Wind power has long been used in water pumping systems. Unfortunately, wind power is not consistently available.

Harnessing wind power for use in pumping fluid can also involve large and costly mechanisms.

Solar power presents an attractive alternative as an energy source. It is readily available in many areas where pumps are required. Others in the past have developed solar powered water pumping systems. Such systems have typically involved using solar power to heat a first working fluid to power an engine. The engine then transfers energy to a second working fluid, typically a hydraulic oil. The hydraulic oil is then used to power a pumping device. The pumping device pumps the water. Examples of such systems are shown in U.S. Pat. Nos. 4,720,978 and 4,666,376.

The drawback associated with these prior systems is that they are unreliable. The unreliability stems from the complexity of the apparatus required to convert the solar energy to energy in the first working fluid, then to fluid power in the hydraulic oil, and finally to energy of the water pumped from the well. The fact that these systems have so many components makes them relatively expensive to manufacture. Such systems are also fairly inefficient.

Thus there exists a need for a solar powered pumping system that is reliable, more economical and more efficient than existing systems.

DISCLOSURE OF INVENTION

It is an object of the present invention to provide a solar powered pumping system that has greater reliability.

It is a further object of the present invention to provide a solar powered pumping system that has higher efficiency.

It is further object of the present invention to provide a solar powered pumping system that is economical to manufacture.

Further objects of the present invention will be made apparent in the following Best Mode for Carrying Out Invention and the appended claims.

The foregoing objects are accomplished in the preferred embodiment of the invention by a solar powered pumping system that includes a solar collector that absorbs radiant energy from the sun and converts it to heat energy. The heat energy is then used to vaporize a conventional refrigerant material which is used as a working fluid.

The solar collector includes a glazing panel that transmits radiant energy into the collector. The collector has a plurality of absorber panels with faces disposed from the glazing panel inside the collector. A first space, extending between the interior surface of the glazing panel and the faces of the absorber panels, houses a continuous web of folded thin PTFE sheet material. The web is formed in a continuous "w" shape and has fold lines that extend horizontally when the solar collector is in its typical operating position. The web enables the transmission of radiant energy to the faces of the absorber panels while limiting the flow of air currents in the first space. By reducing air currents, and by providing a second transmissive surface for trapping radiant energy, the web gives the collector higher efficiency in converting radiant energy to usable heat.

The system further includes a power unit. The power unit has an internal chamber with a movable piston member mounted therein. The piston member is movable between a first position and a second position. A rolling diaphragm of resilient material extends in supporting contact with the piston member. The diaphragm divides the chamber into a first side and a second side. The power unit also includes a driving member in powered connection with the piston member. The power unit also includes a mass which biases the piston member toward the first position.

The system also includes a sucker rod assembly that extends down into a casing of a well. The sucker rod assembly serves as fluid lifting means and is adapted to force water upward to the surface in response to reciprocating motion of a sucker rod. The sucker rod is in driven connection with the driving member of the power unit.

The system further includes a condenser for condensing the working fluid from a vapor to a liquid. Water pumped from the well passes through the condenser and absorbs heat from the working fluid enabling it to change its phase. The system also includes a positive displacement pump for pumping the liquefied working fluid from the condenser and back to the solar collector where it is again vaporized completing the cycle.

The system further includes a valve means which is in connection with the outlet of the solar collector, the first side of power unit and the condenser. The valve means serves to alternatively direct vaporized working fluid into the first side of the chamber of the power unit, and from the first side of the power unit to the condenser. When working fluid is directed into the first side of the chamber the piston member moves upward to a second position. Movement of the piston member moves the driving member and the sucker rod which is in connection therewith.

When the piston member reaches the second position, the valve means changes its condition and directs the working fluid in the first chamber out of the power unit and into the condenser. The mass which is connected to the piston member of the power unit, moves the piston back toward the first position, exhausting the working fluid from the power unit and forcing it into the condenser. As the piston moves toward the first position the sucker rod, which is connected to the driving member, moves back toward its original position inside the well. The reciprocating action of the sucker rod by the driving member of the power unit serves to lift water to the surface. Once the piston member returns to the first position the valve means again changes its condition to repeat the cycle. As the power unit drives the sucker rod in repeated reciprocating motion, water is continuously pumped from the well to the surface where it may be held in a tank or used for other purposes.

BRIEF DESCRIPTION OF DRAWINGS

FIG. 4 is a side sectional view of the solar collector.

FIG. 5 is an enlarged view of the web of the convection barrier and the glazing panel of the solar collector.

FIG. 6 is a front view of the folded web of the convection barrier.

BEST MODE FOR CARRYING OUT INVENTION

Figure 1:
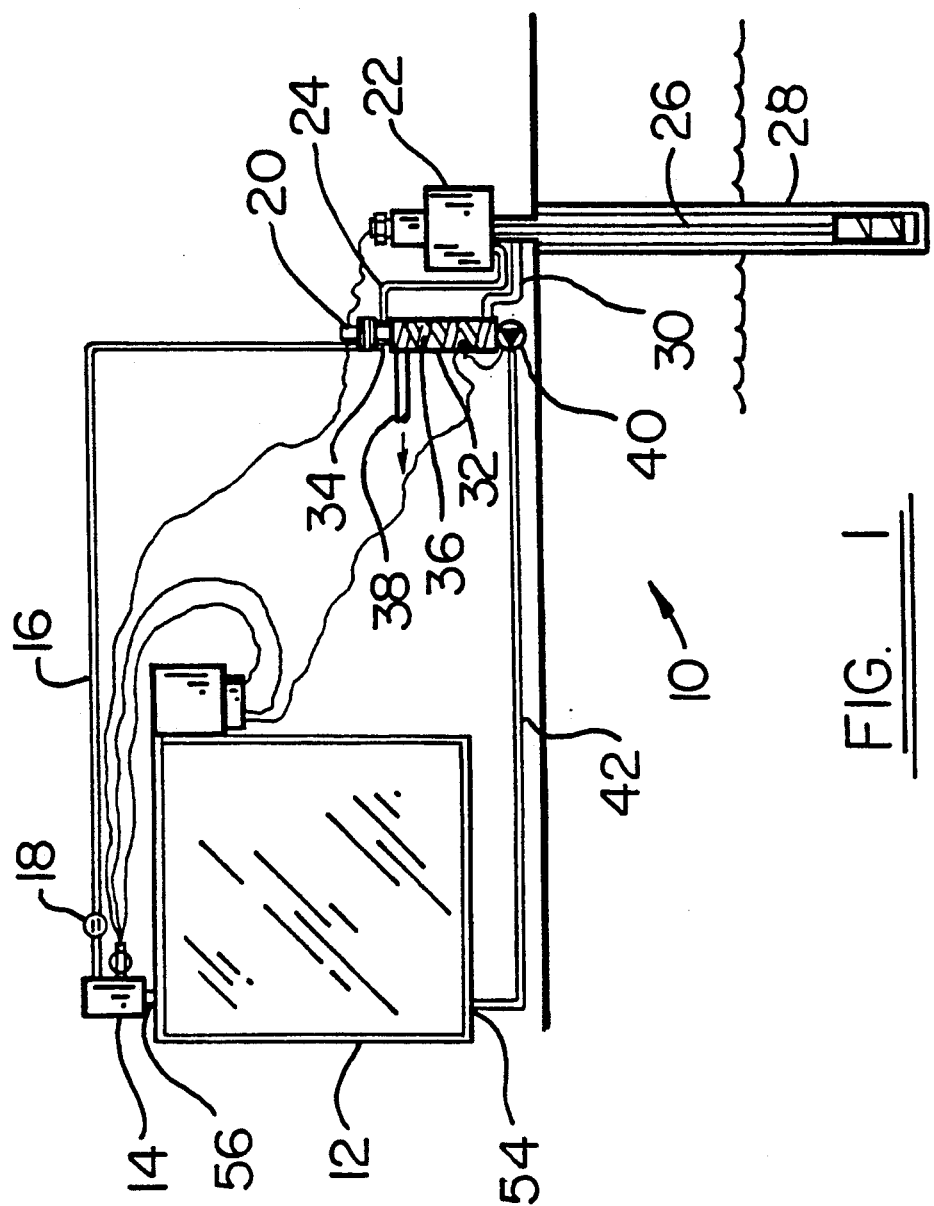
FIG. 1 is a schematic view of the solar powered pumping system of the present invention.

Referring now to the drawings and particularly to FIG. 1, there is shown therein the preferred embodiment of the solar powered pumping system of the present invention generally indicated 10. The system includes a solar collector 12 adapted for absorbing energy from the sun and converting it to heat energy in a manner later explained. The solar collector heats a working fluid therein such as R-134A refrigerant or a material that has similar properties.

The system includes a flash chamber 14 connected to the outlet of solar collector 12. A conduit 16 is connected to the flash chamber. A conventional solenoid valve is positioned in line 16. Line 16 is connected to a motor driven rotary valve assembly 20. Rotary valve assembly 20 is connected to a power unit 22 by a conduit 24. Power unit 22 is connected to a sucker rod assembly 26 which extends in a conventional well casing 28. Well casing 28 extends into the earth to below the water table.

Sucker rod assembly 26 has a water outlet pipe 30 that is connected to a condenser 32. Rotary valve assembly 20 is also connected to condenser 32 by a conduit 34. Water from the water outlet pipe passe through a tube 36 inside condenser 32 and is expelled therefrom through an outlet pipe 38, that is connected to a tank or other water holding or using device.

The working fluid delivered to condenser 32 passes on the outside of the tube 36, undergoing a change of phase from a vapor to a liquid. A positive displacement pump 40 pumps the liquid working fluid from the condenser 32 and through a conduit 42, which returns the working fluid to the solar collector 12.

The system further includes a photovoltaic cell 44. The system also includes a rechargeable battery 46 which is in electrical connection with the photovoltaic cell 44. The cell uses sunlight to provide electricity for the system and to charge the battery 46.

The system of the present invention operates to pump water or other fluid from the ground using solar energy. The operation of the system is described after a detailed description of each of the major components.

Figure 2:
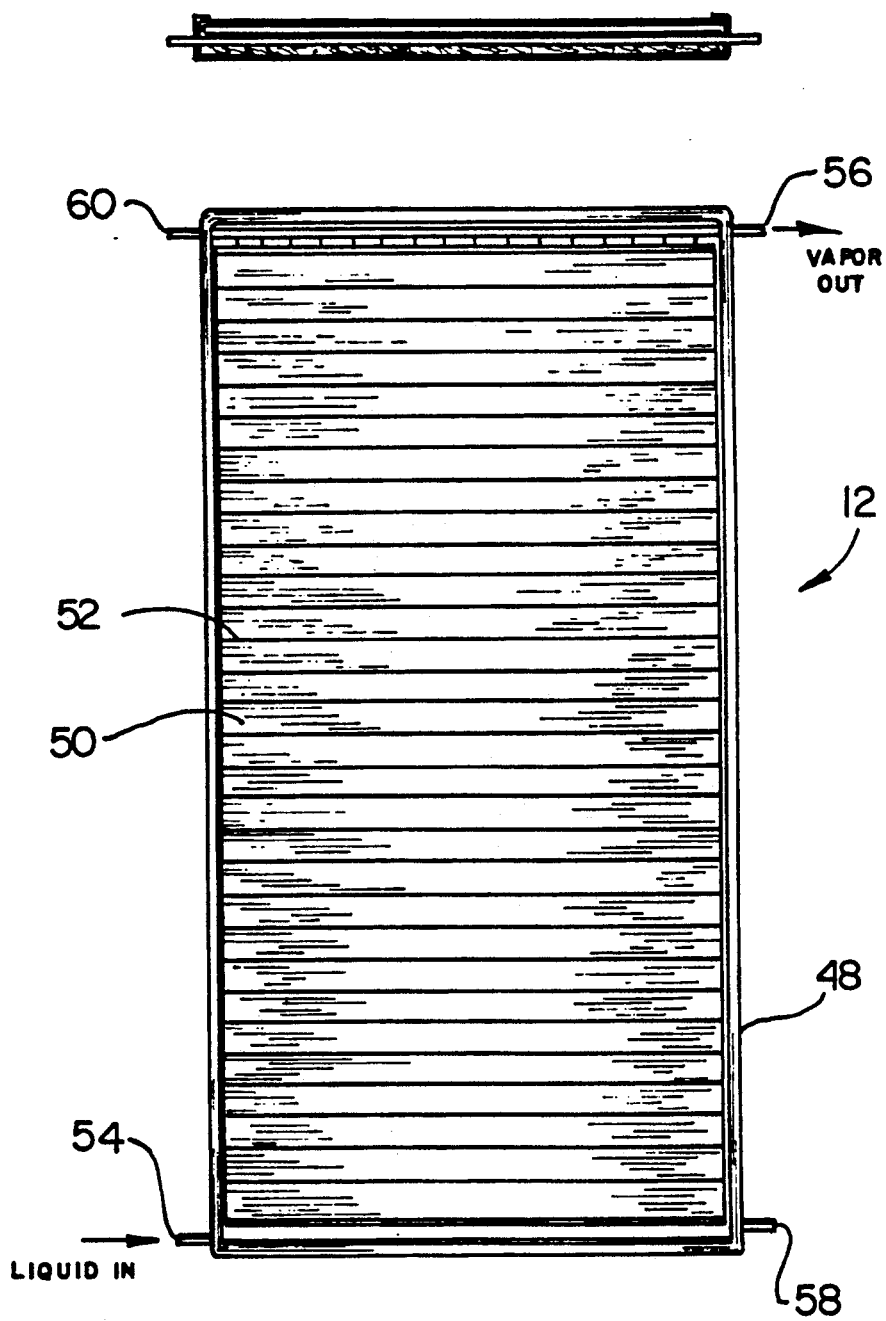
FIG. 2 is a plan view of the solar collector of the system.

Solar collector 12 is shown in detail in FIG. 2. Solar collector 12 has an outer shell 48 which in the preferred form of the invention, is made of plastic material. Shell 48 surrounds the solar collector except at the front where a glazing panel 50 is mounted. Glazing panel 50 enables the transmission of sunlight through the panel into the solar collector (see FIG. 4). A folded web 52 of convection barrier material extends behind glazing panel 50.

Collector 12 has a liquid inlet 54 for accepting liquid working fluid. Inlet 54 is located at the bottom of the collector. A vapor outlet 56 exhausts vaporized working fluid from the collector at the top. Collector 12 has supplemental inlet and outlet fittings, 58 and 60 respectively, which may be used to connect collector 12 into a bank of adjacent solar collectors. However, when not connected to adjacent panels, supplemental fittings 58 and 60 are plugged.

Figure 3:
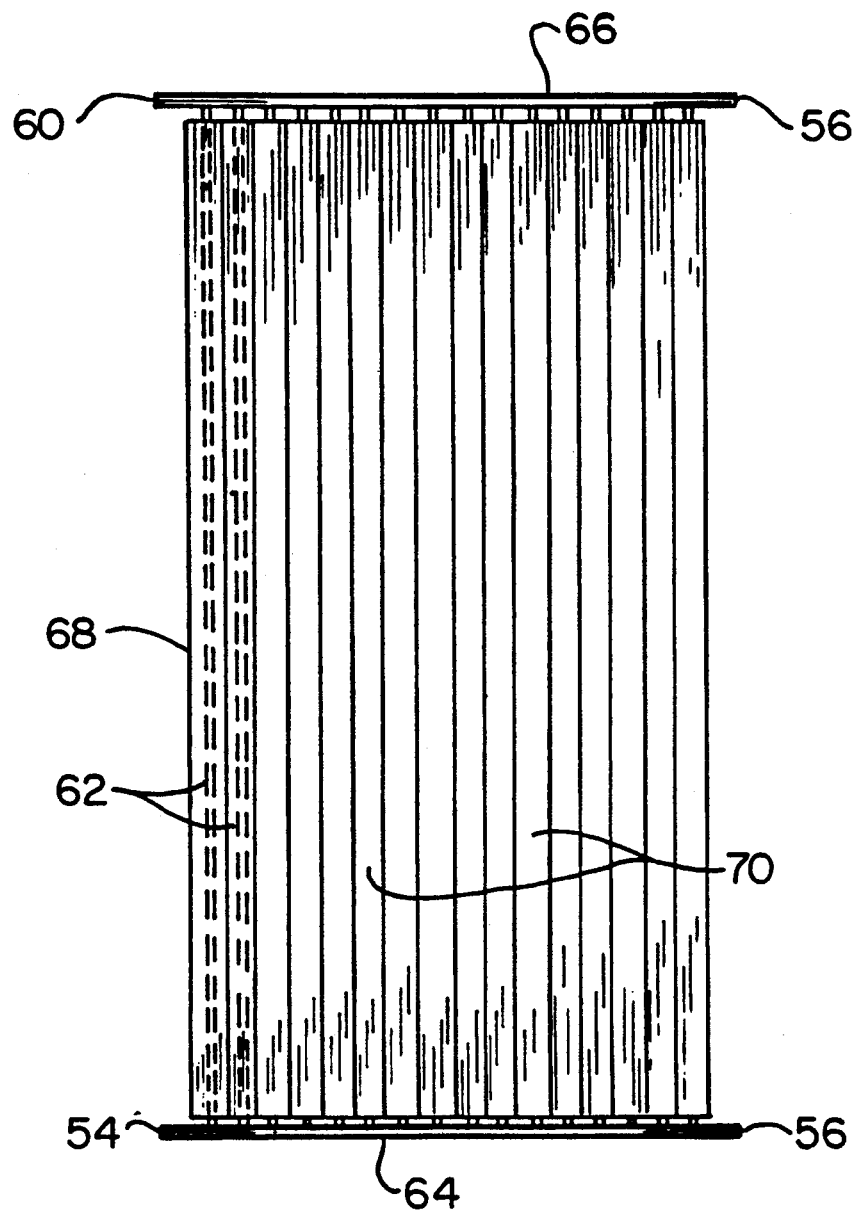
FIG. 3 is a view of the manifold and tube system of the solar collector shown in FIG. 2.

As shown in FIGS. 3 and 4, collector 12 includes a plurality of tubes 62 (only two of which are shown in FIG. 3) extending between a lower manifold 64 and an upper manifold 66. Each tube 62 is associated with an absorber panel 68 which extends the length of each tube. Each absorber panel has a face 70 which is directed towards the glazing panel 50. The faces 70 of absorber panel 68 and an interior surface 72 of glazing panel 50, bound a space generally designated 74. The faces 70 of absorber panels 68 ar coated with a selective black paint which is well known in the prior art, which enables the panels to absorb a high percentage of radiant energy while emitting little energy back.

Figure 8:
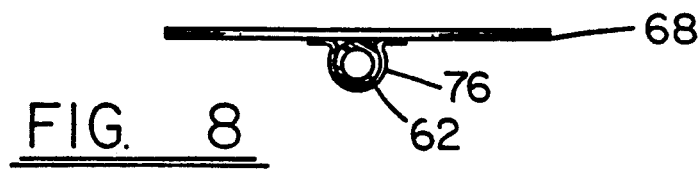
FIG. 8 a top sectional view of the tube and absorber panel shown in FIG. 7.
Figure 7:
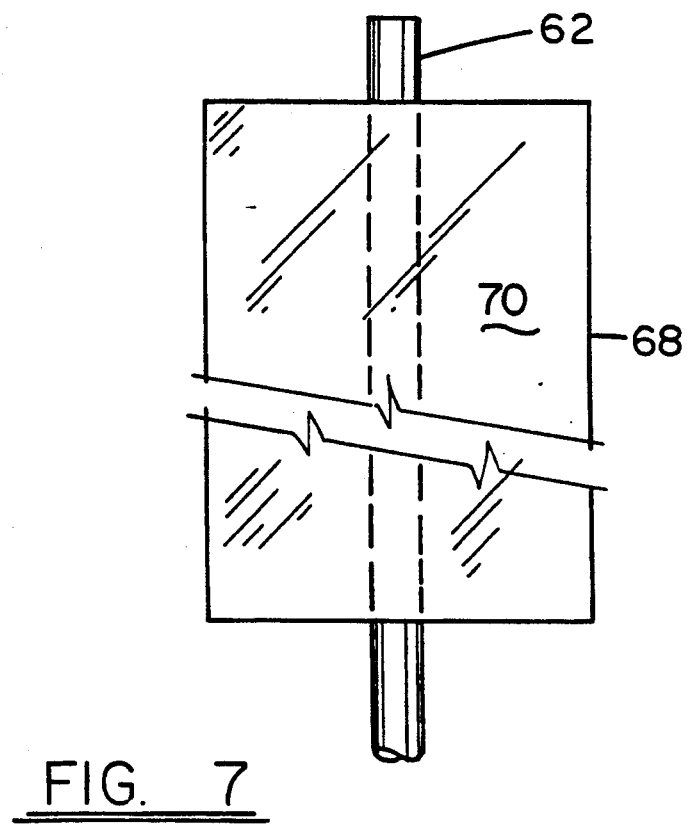
FIG. 7 is a top sectional view of a tube and absorber panel of the solar collector.

As shown in FIG. 8, tubes 62 are bonded to absorber panel 68. Roll formed fins 76 extend about the circumference of tubes 62 to further aid in the transfer of heat from the absorber panels to the tubes, and ultimately to the working fluid flowing through the tubes.

In the preferred embodiment of the invention, the tube fins and absorber panels are aluminum and are welded together. However in other embodiments, they may be comprised of other heat conductive materials, including heat conductive plastics such as Ultem material which is available from the General Electric Company.

As shown in FIG. 4, a pad 78 of foamed insulation material extends behind the tube and panel assemblies to prevent heat transfer out of shell 48 of the solar collector.

The space 74 between the faces 70 of the absorber panels and the interior surface 72 of the glazing panel, is filled by a web 52. Web 52 is comprised of a sheet of thin PTFE material which has high light transmissivity. Web 52 has a continuous "w" shape in cross section with oppositely directed folds 80, best shown in FIGS. 5 and 6. Alternative folds 82 include circular perforations 84 extending through the web. Adhesive bodies, which in the preferred form of the invention are dabs of RTV silicone adhesive extend through perforations 84 and hold web 82 to the interior surface 72 of the glazing panel.

The folds 80 of web 52 extend to adjacent faces 70 of absorber panels 68. Because the folds extend generally horizontally when the panel is in its usual upright position, the folds inhibit the flow of convective air currents over the absorber panels. Such air flow would otherwise tend to cause undesirable cooling effects. The light transmissive web material also tends to hold heat energy in the area between the web and the absorber panels which further enhance the heating efficiency of solar collector 12.

Figure 9:
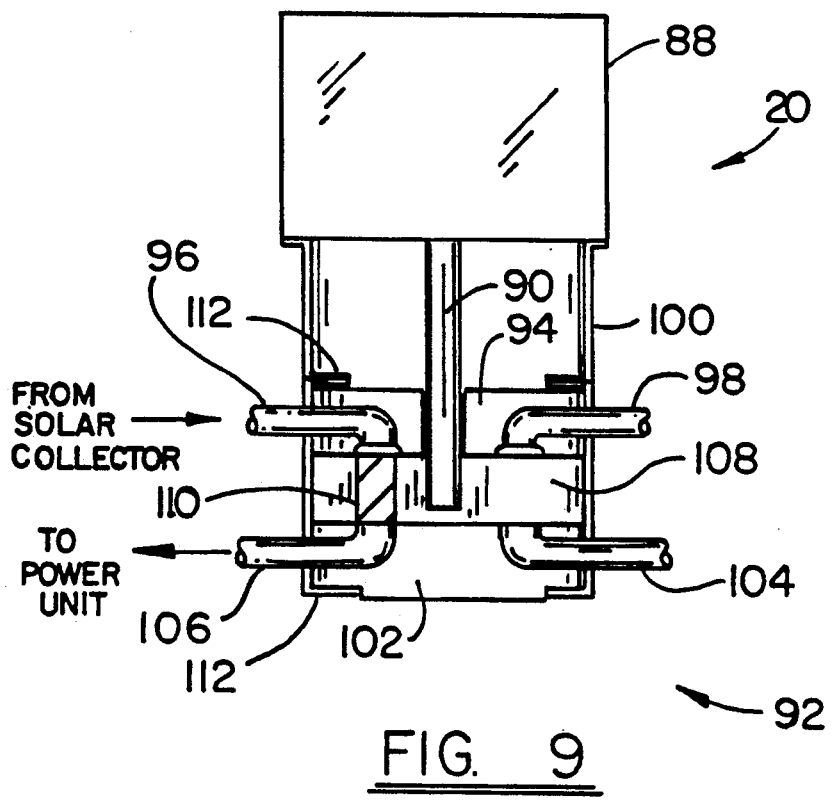
FIG. 9 is a partially sectioned view of the rotary valve and stepper motor assembly of the system in a first condition.

Motor driven rotary valve assembly 20 is shown in detail in FIG. 9. Assembly 20 includes a stepper motor 88 which rotates in fixed angular increments, which in the case of the preferred embodiment are increments of 180 degrees. Motor 88 drives a shaft 90 which extends to a valve assembly 92.

Valve assembly 92 includes a first plate member 94. First plate member 94 has a first fluid inlet 96 and a first fluid outlet 98 extending therethrough. First plate member 94 is held in fixed relation by housing 100.

A second plate member 102 is also mounted in fixed relation in housing 100. Plate member 102 has a second fluid inlet 104 and a second fluid outlet 106 extending therethrough.

A movable plate member 108 is positioned between first plate member 94 and second plate member 102. Movable plate member 108 is attached to shaft 90 and is movable thereby. Movable plate member 108 has a fluid passage 110 extending therethrough. Fluid passage 110 has openings in the surface of movable plate member los at its upper and lower sides.

Figure 10:
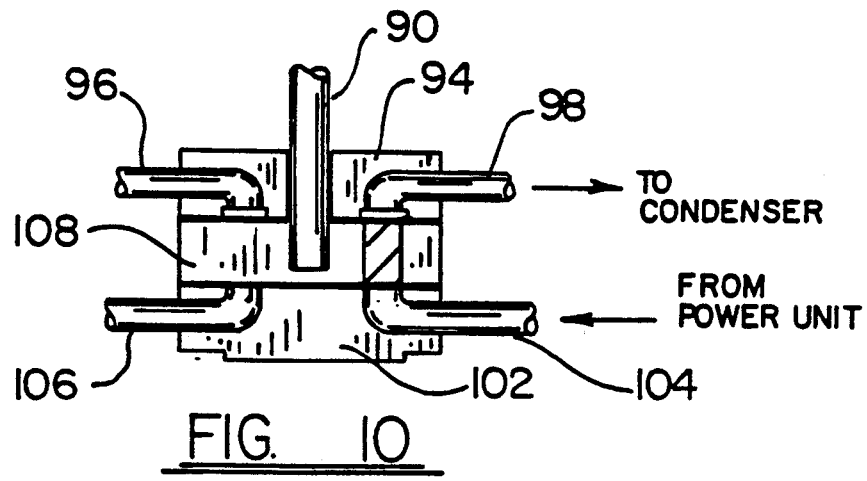
FIG. 10 is a sectional view of the valve assembly shown in FIG. 9 in a second condition.

In a first rotary position of movable member 108 shown in FIG. 9, fluid passage 110 places first inlet 96 and second outlet 106 in fluid communication by overlapping the openings in the adjacent plates. In the second rotary position of movable member 108 shown in FIG. 10 second inlet 104 and first outlet 98 are in fluid communication.

In the preferred form of the invention, the first plate member 94, movable plate member 108 and second plate member 102 are comprised of ceramic material. The ceramic material has surfaces that abut the adjacent plates and have a precise flat finish. The character of the surfaces of the plates enables the movable plate to move while preventing the leakage of working fluid between the plates.

Figure 11:
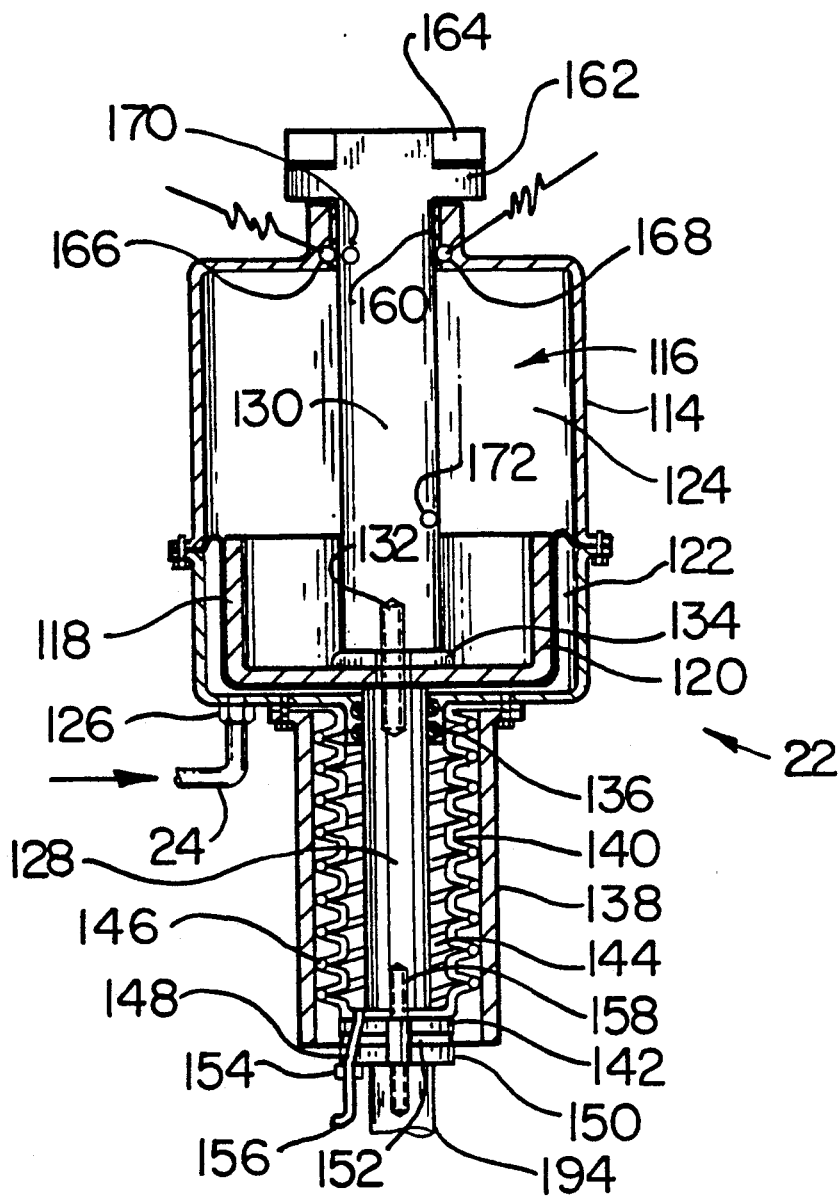
FIG. 11 is a sectional view of the power unit of the pumping system with an internal piston member in a first position.

Power unit 22 is shown in detail in FIG. 11. Power unit 22 has a split clam shell body 114, which encloses a chamber 116. A piston member 118 is movably mounted in the chamber. A rolling diaphragm 120 comprised of resilient material is supported on piston member 118. Rolling diaphragm 120 is in fluid tight relation with the outer wall of body 114, and divides chamber 116 into a first side 122 and a second side 124. First side 122 is in fluid communication with an inlet fitting 126 which is connected to conduit 24 of the system. Second side 124 is open to atmosphere.

Piston member 118 is connected to a driving member 128 at its lower side. Piston member 118 is also connected to an upper member 130, which in the preferred form of the invention, is a hollow rod. Driving member 128 and upper member 130 are held to piston member 118 by a fastener 132 which threads into driving member 128 and into a lower flange 134 at the bottom of upper member 130. The fastener 132 also extends through an opening in rolling diaphragm member 120, however the abutting faces of the piston member and driving member prevent the leakage of working fluid through the opening.

Driving member 128 extends through a first opening (not separately shown) in a lower wall of body 114. The first opening is bounded by a shaft seal 136. A bellows housing 138 extends downward from housing 114 and a spring loaded sealed bellows 140 extends in the bellows housing. Bellows 140 is sealed at its upper end by interfitting between body 114 of the power unit and the bellows housing 136. The bellows 140 is sealed at its lower end by interfitting between driving member 128 and a first flange 142.

Bellows 140 surrounds an internal bellows area 144 into which any working fluid which leaks past seal 136 is held. Bellows 140 includes a bellows outlet 146. Bellows outlet 146 extends through a bellows outlet passage 148 in first flange 142, as well as through a second flange 150 and a resilient pad member 152, which is positioned between the flanges. Bellows 148 is connected to a bellows outlet fitting 154 on the second flange 150. Bellows outlet fitting 154 is connected to a flexible hose 156 suitable for carrying the Working fluid.

Flanges 142, 150 and pad 152 are held together by a fastener 158. Fastener 158 also holds the driving member 128 to the flanges. Flange 150 is part of the sucker rod of the sucker rod assembly 26 which is later described in detail. The flange/pad assembly provides a limited swivel joint which enables the sucker rod and the driving member of the power unit to tolerate some misalignment without interfering with their operation.

Upper member 130 extends out an upper wall of body 114 through a second opening (not separately shown). A bushing 160 supports member 130 in the second opening. Upper member 130 includes an outward extending top flange 162 on the outside of body 114. A heavy mass 164 is mounted on top flange 162. Mass 164 serves as biasing means for biasing downward the connected upper member, piston member and driving member.

A first magnetic sensing switch 166 (shown schematically) is mounted on body 114 adjacent the second opening. A second magnetic sensing switch 168 is also mounted adjacent the second opening but is displaced from the first switch. Body 114 is preferably made of non-magnetic plastic material that enables the magnetic switches 166 and 168 to sense magnetic fields adjacent thereto.

The upper member 130 is also preferably made of plastic material. The upper member includes a first magnetic element 170 and a second magnetic element 172 mounted therein. The magnetic elements are positioned so that in the first position of piston member 118, shown in FIG. 11, magnetic element 170 is adjacent to and actuates switch 166. In a second raised position of the piston member (shown in phantom in FIG. 11) second magnetic element 172 is adjacent and actuates switch 168.

Figure 12:
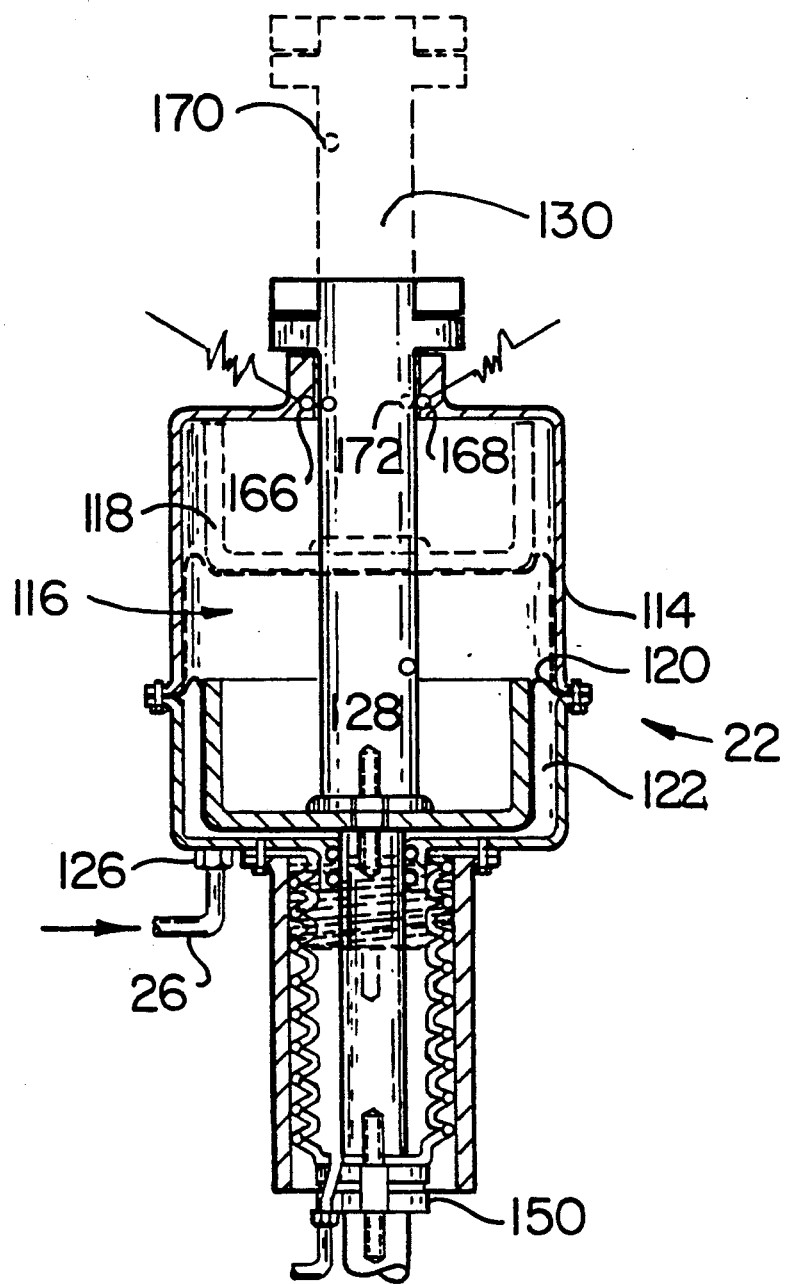
FIG. 12 is a sectional view of the power unit shown in FIG. 11 with the internal piston member in a second position.

Piston member 118 is movable between the first position shown in FIG. 11 and the second position shown in FIG. 12, in response to the delivery or exhaust of working fluid into the first side 122 of chamber 116 through inlet fitting 126. Movement of piston member 118 correspondingly moves driving member 128, and the sucker rod of the sucker rod assembly 26 attached thereto at second flange 150.

Figure 13:
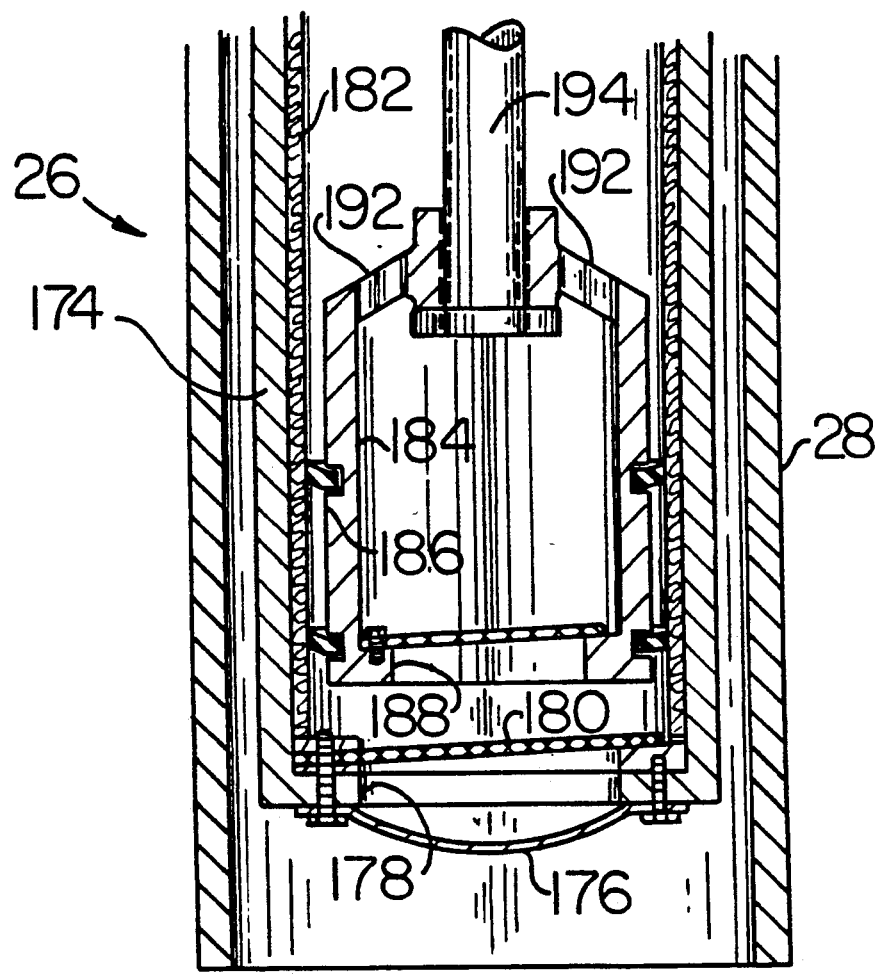
FIG. 13 is a sectional view of the shuttle body of the sucker rod assembly of the pumping system.
Figure 14:
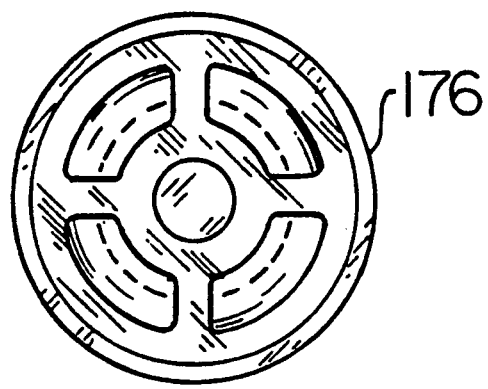
FIG. 14 is a bottom view of the bottom screen of the sucker rod assembly.
Figure 15:
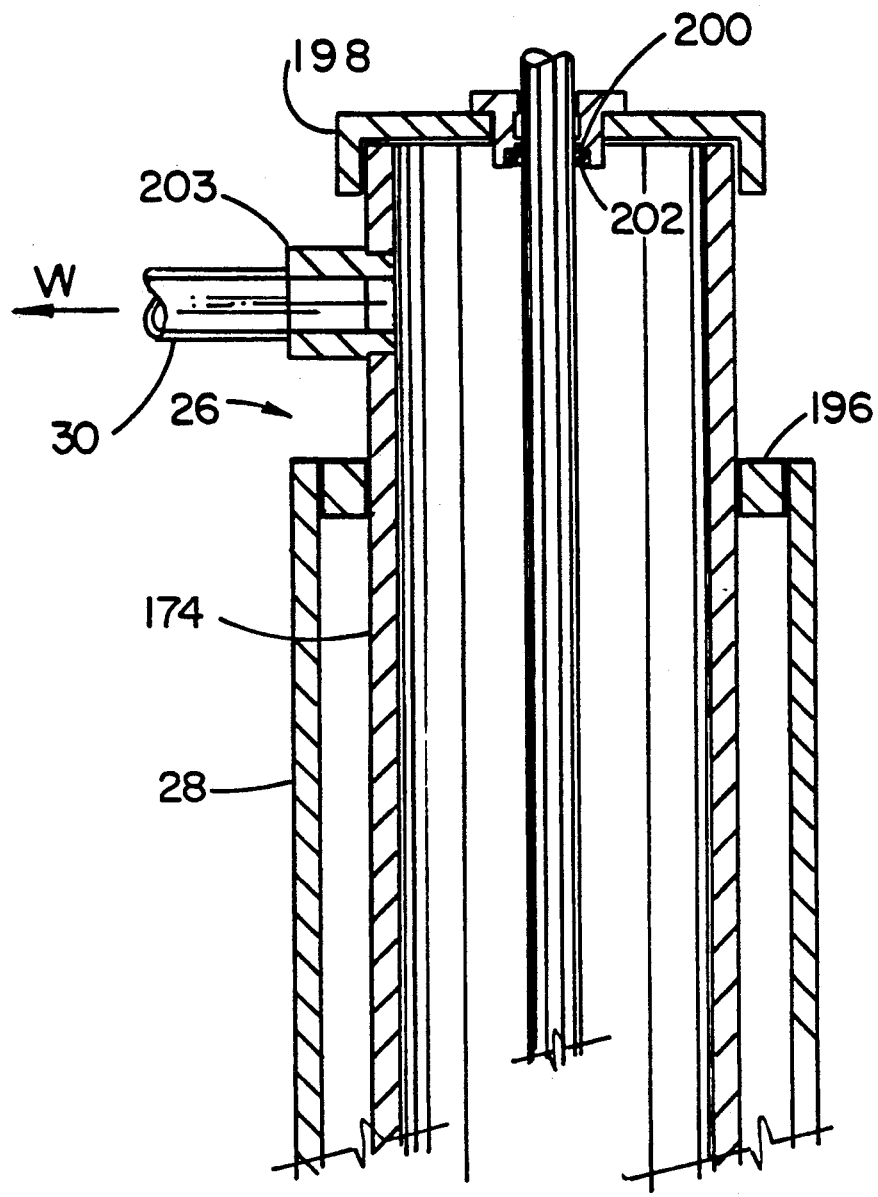
FIG. 15 is a sectional view of the upper portion of the sucker rod assembly of the system.

Sucker rod assembly 26 is shown in greater detail in FIGS. 13 through 15. The sucker rod assembly is mounted inside a conventional steel well casing 28 which extends down into the earth into an area below the water table. Assembly 126 includes plastic inner well pipe 174 which extends down almost to the bottom of casing 28 as shown in FIG. 13. Inner well pipe 174 also extends upward above the casing as shown in FIG. 15. At the lower end of inner well pipe 174, a screen 176 is mounted as shown in FIGS. 13 and 14. Screen 176 prevents the introduction of rocks or other debris that could interfere with the pumping action of the sucker rod assembly.

Mounted above screen 176 in a lower opening 178 to well pipe 174, is a flapper type foot valve 180. Mounted inside the lower portion of well pipe 174 is a PTFE tube 182. Tube 182 is relatively thin and its outer wall is in abutting contact with the inner wall of well pipe 174.

A shuttle body 184 is movably mounted inside tube 182. Shuttle body 184 has a generally cylindrical outer wall that is slightly disposed from tube 182. Ring seals 186 of PTFE material extend between shuttle body 184 and tube 182. Seals 186 prevent the passage of water around the exterior of the shuttle body while enabling the shuttle body to be readily movable inside tube 182.

Shuttle body 184 has a lower opening 188. A one way flapper 190 is positioned above opening 188. Shuttle body 184 also has a pair of upper openings 192. Shuttle body is attached at its top to a fiberglas sucker rod 194.

In operation, sucker rod 194 is reciprocated up and down by the driving member of the power unit. The movement of the sucker rod 194 moves shuttle body 184 in similar motion. As shuttle body 184 moves up, water is drawn into the area below the shuttle body through the foot valve 180. Thereafter as the shuttle body 184 moves downward, the water below the shuttle body is trapped by the foot valve and is forced past flapper 190. The water is then moved through the interior of the shuttle body and out the upper openings 192. Water is thus forced to move upward inside the inner well pipe 174.

The shuttle body and sucker rod are made of plastic in the preferred embodiment, so that they have lighter weight and are actually less dense than the water being pumped. These features in combination with the low friction of the seals surrounding the shuttle body greatly reduces the force required for pumping action.

The upper portion of sucker rod assembly 26 is shown in FIG. 15. The inner well pipe 174 extends vertically above casing 28. The space between the inner well pipe and the casing is closed by a spacer 196. A cap 198 closes the top of well pipe 174. Sucker rod 194 extends outward through cap 198. The sucker rod is journaled in a bushing 200. A seal 202 extends between the sucker rod and the bushing to prevent the flow of water out of the well pipe around the bushing.

An outlet fitting 203 extends through inner well pipe 174 above the casing. Outlet fitting 203 is connected to outlet water pipe 30. Water flows out of water pipe 30 in the direction of Arrow W in response to the reciprocating motion of the sucker rod.

Figure 16:
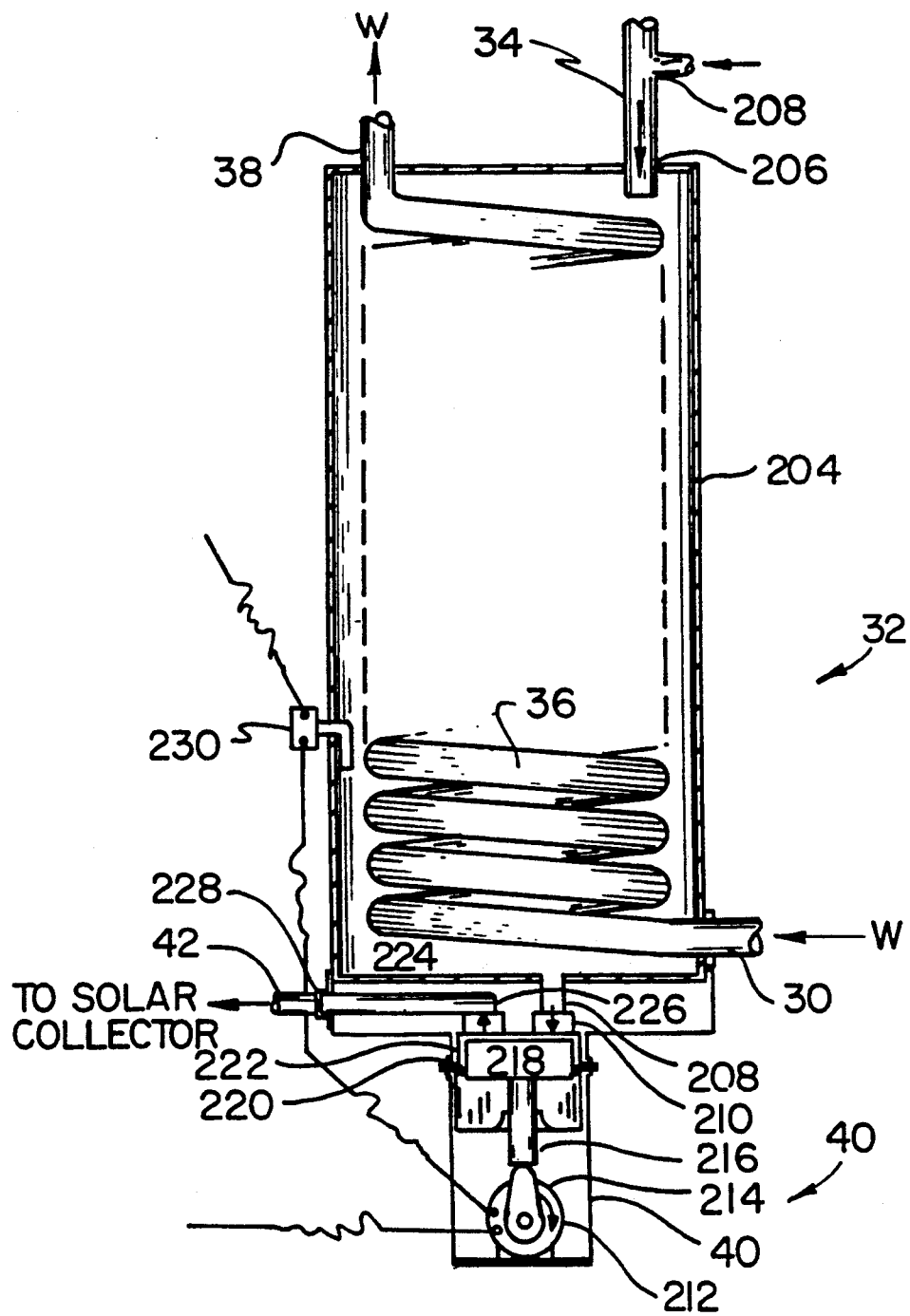
FIG. 16 is a sectional view of the condenser and positive displacement pump of the system.

Water is delivered in water outlet pipe 30 to condenser 32 which is shown in detail in FIG. 16. Condenser 32 has an outer shell 204. Spiral tube 36 which is made of thermally conductive material, extends through the interior of the shell and is connected to water outlet pipe 38 at the top. Conduit 34 from the rotary valve assembly delivers working fluid into a fitting 206 at the top of the condenser. Hose 156 from the bellows area 144 of the power unit is also connected to conduit 34 at a "T" 208 located outside the condenser.

Condenser 32 has a liquid outlet passage 208 in its lower wall. A check valve 210 is mounted in liquid outlet passage 208. Check valve 210 only allows liquid working fluid to flow out of the condenser.

Liquid is delivered from outlet passage 208 into positive displacement pump 40 which is mounted on the lower portion of the condenser. Pump 40 includes an electric motor 212 which is connected to a cam 214. Cam 214 moves a follower rod 216 which is connected to a piston 218. A rolling diaphragm 220 is supported by the top of piston 218.

Diaphragm 220 encloses a chamber 222 which is located above the piston. The area of chamber 222 expands and contracts upon movement of piston 218.

A pump outlet passage 224 extends out from chamber 222. A second check valve 226, which only enables fluid to flow out of chamber 222, is positioned in outlet passage 224. Outlet passage 224 is connected to conduit 42 at a fitting 228.

Operation of electric motor 212 moves piston 218 in a reciprocating up and down motion. The resulting expansion and contraction of chamber 222 in combination with check valves 210 and 226 pump liquid working fluid out of condenser 32 and into conduit 42 which delivers the liquid working fluid back to solar collector 12.

A level switch 230 is mounted inside condenser 32. Level switch 230 operates in a conventional manner to detect the level of liquid working fluid in the condenser. Level switch 230 is connected to motor 212 of pump 40 and controls the pump so that it only operates when liquid working fluid has accumulated to a certain level in the condenser. The level switch then shuts pump 40 off when the liquid level has fallen to near the bottom of the condenser.

Figure 17:
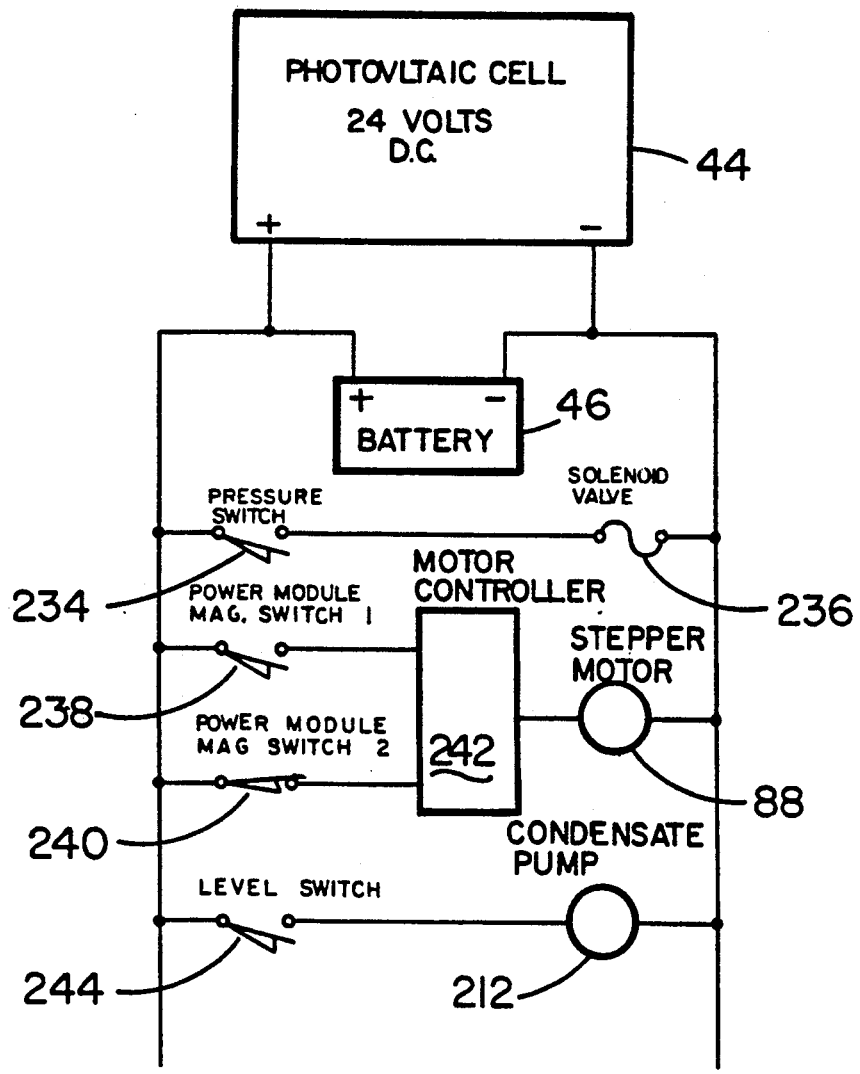
FIG. 17 is an electrical schematic for the system.

An electrical schematic for controlling the various components of the system is shown in FIG. 17. Photovoltaic cell 44 is electrically connected to battery 46 and to the remainder of the electrical components. Pressure sensing switch 232 operates switch contacts 234. Contacts 234 operate to energize a solenoid 236 of solenoid valve 18.

First magnetic switch 166 o the power unit controls switch contacts 238, and second magnetic switch 168 controls switch contacts 240. The switch contacts send electrical signals to a motor controller 242. The controller 242 sends signals to the stepper motor 88, which turns the valve assembly 92.

Level switch 230 of condenser 32 controls switch contacts 244. Contacts 244 serve to energize motor 212 which operates the positive displacement pump 40.

The operation of the solar powered pumping system 10 is now explained. The working fluid, which in the preferred embodiment is a refrigerant material such as R-134A, is heated by solar energy in solar collector 12. As the radiant energy is absorbed by the absorber panels 68 it heats the working fluid in the tubes 62. The heated working fluid turns into a vapor and leaves the solar collector through vapor outlet 56.

From vapor outlet 56, the vaporized working fluid enters flash chamber 14 which is a hollow chamber. An electrical pressure sensing switch 232 (shown schematically in FIG. 1) senses the pressure in flash chamber 14. If the pressure of the working fluid is sufficiently high to operate the power unit to pump water (usually above about 30 PSI) pressure switch 232 generates an electrical signal to open solenoid valve 18. Electricity used to operate pressure switch 232 and solenoid valve 18 is provided by battery 46.

The operation of pressure switch 232 and solenoid 18 is important to the reliability of the system, because attempts to operate the pumping unit when there is insufficient energy available in the working fluid could cause damage. For example, such attempts could result in liquid working fluid passing to the rotary valve assembly and power unit which could cause damage to these components. Also, operation at low solar energy levels could fully discharge the battery.

The high pressure vaporized working fluid passes through conduit 16 to the motor driven rotary valve assembly 20. The rotary valve assembly 92 receives the high pressure working fluid from the solar collector through first fluid conduit 96, which is connected to conduit 16. When the valve assembly is in the first position shown in FIG. 9, the working fluid passes through the valve and exits through second fluid outlet 106. In this first position of the valve assembly, passages 98 and 104 are blocked.

Second fluid outlet 106 of the valve assembly is connected to conduit 24 which delivers working fluid to and from power unit 22. As shown in FIG. 11, conduit 24 is connected to the first side 122 of chamber 116 of the power unit. The delivery of working fluid to the power unit causes piston 118 to move upward, correspondingly moving driving member 128 and upper member 130 upward.

When piston 118 has moved upward to the position shown in phantom in FIG. 12, second magnetic element 172 moves adjacent to second magnetic switch 168. Second magnetic switch 168 is electrically connected through motor controller 242 to stepper motor 88. The tripping of magnetic switch 168 causes the stepper motor to rotate the valve assembly 180 degrees to the position shown in FIG. 10.

Second fluid conduit 104 is also in connection with conduit 24, and the first side 122 of chamber 116 of power unit 22. First fluid outlet 98 is connected to conduit 34 which delivers working fluid to the condenser 32.

Mass 164 at the top of upper member 130 of the power unit biases the piston member 11 and the driving member 128 downward. The biasing force pushes working fluid out of the power unit through the valve assembly 92 and into the condenser.

Eventually the upper member falls to the position shown in FIG. 11. As the first magnetic element 170 moves adjacent to magnetic switch 166, the switch is tripped. First magnetic switch 166 is also electrically connected through controller 242 to stepper motor 88 of motor and valve assembly 20. The tripping of switch 166 causes the motor to rotate the valve assembly 92, 180 degrees back to the position shown in FIG. 9. As a result, working fluid is again delivered to the power unit, and piston member 118 and driving member 128 begin moving upward, beginning another cycle.

The stepper motor 88 and switches 166 and 168 are powered by battery 46 of the system. The battery of the system remains charged because it is connected to photovoltaic cell 44, which charges the battery automatically whenever sunlight is available. Further, the electrical components of the system can operate solely on the power generated by the photovoltaic cell when the available solar energy is sufficiently high.

Driving member 128 is connected to the sucker rod assembly 26 through flange 150 which is attached to the sucker rod 194. As the driving member 128 moves repeatedly up and down it moves the sucker rod 194 in a similar motion. The sucker rod moves the shuttle body 184 located at the bottom of the well.

As previously described, movement of the shuttle body 184 upward pulls water into the inner casing 174 through the foot valve 180. Thereafter the downward movement of the shuttle body pushes water under the shuttle body through the flapper 190. As a result, water is forced upward out of the shuttle body through the upper openings 192.

The water rises in the inner well pipe 174 until it reaches the receiving area at the top of the inner well pipe shown in FIG. 15. The water then passes out of the inner well pipe through fitting 203 and into the water outlet pipe 30.

As shown in FIG. 16 the water in water outlet pipe 30 passes through condenser 32. The water passes through coil 236 and exits through outlet pipe 38. Outlet pipe 38 is connected to a tank or other suitable water holding or using devices.

As the water passes through the condenser 32 it absorbs heat from the working fluid that has been exhausted from the power unit 22 through valve assembly 92. The working fluid enters the condenser at the top through fitting 206. Conduit 34 also delivers into the condenser any working fluid which has entered hose 156. Hose 156 carries any working fluid that has escaped past shaft seal 136 of the power unit around driving member 128, and which has entered area 144 inside the bellows. As a result, none of the working fluid is lost from the system.

In condenser 32 the working fluid loses heat to the water and changes phase to a liquid. The liquid collects in the bottom of the condenser until the liquid level rises and level switch 230 is tripped.

When the level switch 230 is tripped it starts electric motor 212 of the positive displacement pump 40. As a result, piston 218 beings to cycle up and down pumping the liquid refrigerant from outlet passage 208 to outlet passage 224 and into conduit 42.

Conduit 42 delivers the liquid working fluid back to the liquid inlet 54 of the solar collector 12. The liquid working fluid again gains heat in the solar collector and changes from a liquid to a vapor repeating the cycle.

The system of the present invention has many advantages over prior systems. It is highly efficient in converting solar energy to pumping work. It is also highly reliable and has few moving parts which is very important to operation in remote areas. In the preferred embodiment, it is also compact and light in weight, which are also important when the system must be transported to a remote site.

While the preferred embodiment of the invention is adapted for use in pumping water, other liquid substances found in the earth such as oil, may also be pumped using the system of the present invention. Further, although the pumping system of the preferred embodiment is used to pump fluid from a conventional vertical well, the pumping system of the present invention may also be used to pump fluids from other types of reservoirs.

Thus, the high efficiency solar powered pumping system of the present invention achieves the above stated objectives, eliminates difficulties encountered in the use of prior devices and systems, solves problems and attains the desirable results described herein.

In the foregoing description certain terms have been used for brevity, clarity and understanding, however no unnecessary limitations are to be implied therefrom because such terms are for descriptive purposes and are intended to be broadly construed. Moreover, the descriptions and illustrations are by way of examples and the invention is not limited to the exact details shown and described.

Having described the features, discoveries and principles of the invention, the manner in which it is constructed and operated and the advantages and useful results obtained; the new and useful structures, devices, elements, arrangements, parts, combinations, systems, equipment, operations and relationships ar set forth in the appended claims.

We claim:

1. A system for pumping a fluid from a well using solar energy, comprising:
   solar energy collector means for converting solar energy to heat energy, said solar collector means heating a first working fluid therein, said first working fluid being vaporized in said collector means;
   a power unit, said power unit including:
      a body, said body enclosing a cylindrical chamber;
      a piston member mounted for movement in said chamber;
      a resilient diaphragm member extending across said chamber, said diaphragm member supported on said piston member, said diaphragm member movable with said piston member between first and second positions of said piston member in said chamber, said diaphragm member dividing said chamber into a first side and a second side;
   said power unit further including a driving member, said driving member in connection with said piston member, said driving member extending through said first side of said chamber and out of said body through a first opening in said body;
      seal means adjacent said first opening for preventing the escape of fluid from said first side of said chamber; and
      biasing means for biasing said piston member towards said first position;
   fluid lifting means extending in said fluid in said well, said lifting means in connection with said driving member of said power unit, for moving pumped fluid in said well upward in response to reciprocating motion of said driving member;
   condenser means for condensing said first working fluid from vapor to liquid, said condenser means in fluid communication with said collector means and enabling return of said liquid first working fluid thereto;
   valve means for directing fluid therethrough, said valve means in fluid connection with said first side of said power unit, said valve means in further fluid connection with said collector means and said condenser means, said valve means alternatively placing said first side of said chamber of said power unit in fluid communication with said collector means to deliver vaporized working thereto, or said condenser means;
   whereby said piston member moves between the first and second positions responsive to delivery and release of said vaporized first working fluid from said first side of said chamber of said power unit through said valve means, said power unit moving said fluid lifting means in reciprocating motion to pump said pumped fluid from said well.

2. The system according to claim 1 wherein said diaphragm member is a rolling diaphragm.

3. The system according to claim 2 wherein said power unit is positioned with said first side vertically below said second side, and wherein said power unit further includes an upper member extending upward from said piston member and through a second opening in said body, and wherein said biasing means includes a mass mounted on said upper member external of said body.

4. The system according to claim 3 wherein said system further comprises an electrical power source; and said valve means comprises a valve body; a valve element movably mounted in said body for directing flow through said valve body in response to movement thereof; and an electric motor means in connection with said power source and said valve element for moving said element.

5. The system according to claim 4 wherein said valve element of said valve means is a disk shaped element and said element is rotatably movable in said body, said element including a plurality of fluid passages therethrough for selectively directing said first working fluid through said valve means responsive to a rotational position of said element; and
   wherein said electric motor means is a stepper motor moving said element between a plurality of rotational positions, and wherein in a first element position said first side of said chamber of said power unit is in fluid communication with said collector means, and in a second element position said first side of said chamber is in fluid communication with said condenser means.

6. The system according to claim 5 and wherein said system further comprises:
   electrical switch means in operative connection with said upper member of said power unit and said stepper motor, and wherein said switch means has a first condition when said upper member is in an upward extended location and said switch means has a second condition when said upper member is in a downward extended location; and
   wherein said stepper motor is operative to move said valve element to the first element position when said switch means is in the second condition, and to the second element position when said switch means is in the first condition;

whereby said piston member of said power unit undergoes reciprocating motion.

7. The system according to claim 6 wherein said passages through said valve element have at least one element opening on an element surface, and said element is in abutting contact in said body with a supporting surface, said supporting surface having at least one surface opening, whereby flow through said valve element is enabled when said element surface openings are in overlapping relation and wherein said element surface and supporting surface are comprised of low friction ceramic materials.

8. The system according to claim 7 wherein said electrical power source includes a battery, and a photovoltaic cell, said cell converting solar energy to electric energy and charging said battery.

9. The system according to claim 8 wherein said system further includes pressure sensing means for sensing pressure of said first working fluid leaving said collector means, and pressure valve means in connection with said pressure sensing means and enabling flow of said working fluid from said collector means to said valve means only when said pressure is sufficiently high to operate said power unit.

10. The system according to claim 9 wherein said pressure valve means is an electrically actuated valve and said valve is in electrical connection with said battery.

11. The system according to claim 10 wherein said condenser means includes heat exchanger means, and said pumped fluid from said well passes through said heat exchanger means and absorbs heat from said first working fluid.

12. The system according to claim 11 and further comprising an electrically powered positive displacement pump for pumping liquid working fluid from said condenser means to said solar collector means.

13. The system according to claim 12 wherein said positive displacement pump is a diaphragm pump.

14. The system according to claim 13 wherein said lifting means includes a sucker rod and a shuttle housing comprised of a material having a density less than the pumped fluid.

15. The system according to claim 14 wherein said shuttle housing is movable in a inner pipe in said well, and a lower portion of said inner pipe includes foot valve means enabling pumped fluid to flow into said inner pipe from said well while preventing outward flow.

16. The system according to claim 15 wherein said inner pipe of said lifting means includes an inside wall adjacent said shuttle housing comprised of a low friction material; and said shuttle housing has shuttle seal means for sealing between said shuttle housing and said inside wall.

17. The system according to claim 16 wherein said shuttle seal means of said shuttle housing includes at least one seal ring of PTFE material.

18. The system according to claim 17 wherein said first seal means of said power unit includes at least one shaft seal for sealing said first opening adjacent said driving member, and a bellows external of said first chamber and having an internal bellows area in fluid tight communication with said shaft seal for capturing first working fluid that passes said shaft seal.

19. The system according to claim 18 wherein said body of said power unit includes a cylindrical bellows housing extending from a lower portion thereof, said bellows positioned within said bellows housing, and wherein said bellows is a spring loaded bellows.

20. The system according to claim 19 wherein said power unit further comprises fluid passage means, said fluid passage means in fluid communication with said internal bellows area and said condenser means, whereby working fluid captured after passing said shaft seal into said internal bellows area is delivered to said condenser.

21. The system according to claim 20 wherein said bellows is comprised of PTFE material.

22. The system according to claim 21 and further comprising an angularly movable joint between said driving member of said power unit and said sucker rod of said lifting means.

23. The system according to claim 22 wherein said angularly movable joint comprises a first flange member in connection with said driving member of said power unit, and a second flange member in connection with said sucker rod, and a plate of relatively resilient material between said flanges; and holding means for holding said plate in interfitting relation between said flanges.

24. The system according to claim 23 wherein said holding means is a fastener in centered relation of said flanges.

25. The system according to claim 24 wherein said upper member of said power unit is hollow and comprised of non-magnetic material, and wherein said switching means includes magnetic actuated switches mounted adjacent said upper member, and magnetic elements mounted on said upper member of said power unit.

26. The pumping system according to claim 1 wherein said solar collector means comprises:
a solar glazing panel enabling radiation to be generally transmitted therethrough, said glazing panel having a first glazing end and a second glazing end, said first glazing end vertically higher than said second glazing end when said collector means is in operation;
solar absorber means for absorbing radiation transmitted through said glazing panel, said absorber means having at least one absorber face extending generally parallel of said glazing panel and disposed therefrom a first distance, whereby a first space is defined by said glazing panel and said face; and
a light transmissive convection barrier means in said first space for enabling the passage of light through said first space while inhibiting the flow of air in a direction towards said first glazing end.

27. The system according to claim 26 wherein said light transmissive convection barrier means of said solar collector means comprises a folded, continuous web of radiation transmissive material in said first space said web having folds extending generally horizontally.

28. The system according to claim 27 wherein said glazing panel of said solar collector means has an interior surface, said web folded in a continuous "w" shape in cross section, said folds including generally horizontally extending fold lines, and said web attached by attaching means to said interior surface of s id glazing panel at alternate fold lines.

29. The system according to claim 2 wherein said web of said solar collector means consists essentially of thin PTFE sheet material and said web includes perforations at said alternate fold lines, said attaching means for attaching said web to said glazing panel including adhesive bodies extending through said perforations and attached to said glazing panel interior surface, and said folds of said web disposed from said glazing panel interior surface positioned in close proximity to said face of said absorber means.

30. The system according to claim 29 wherein said adhesive bodies of solar collector means are slugs of silicone RTV adhesive.

31. The system according to claim 30 wherein said pumped fluid is water.

* * * * *